United States Patent
Howarth et al.

(10) Patent No.: US 7,827,263 B1
(45) Date of Patent: Nov. 2, 2010

(54) SYSTEMS AND METHODS FOR MANAGING A COMPUTER OVER A NETWORK

(75) Inventors: Mark E. Howarth, South Jordan, UT (US); Peter E. Johnson, Lehi, UT (US); Alan B. Butt, Orem, UT (US); David A. Eatough, Herriman, UT (US)

(73) Assignee: Crimson Corporation, Dover, DE (US)

( * ) Notice: Subject to any disclaimer, the term of this patent is extended or adjusted under 35 U.S.C. 154(b) by 576 days.

(21) Appl. No.: 11/468,584

(22) Filed: Aug. 30, 2006

(51) Int. Cl.
*G06F 15/173* (2006.01)

(52) U.S. Cl. .......... 709/223; 709/206
(58) Field of Classification Search .......... 709/223, 709/206; 707/1
See application file for complete search history.

(56) References Cited

U.S. PATENT DOCUMENTS

| | | | |
|---|---|---|---|
| 6,321,337 B1 * | 11/2001 | Reshef et al. | 726/14 |
| 6,339,587 B1 | 1/2002 | Mishra | |
| 6,671,724 B1 | 12/2003 | Pandya et al. | |
| 7,127,441 B2 | 10/2006 | Musman | |
| 7,136,913 B2 * | 11/2006 | Linderman | 709/223 |
| 7,558,862 B1 * | 7/2009 | Tyukasz et al. | 709/227 |
| 2002/0065908 A1 * | 5/2002 | Agerholm et al. | 709/223 |
| 2003/0212750 A1 | 11/2003 | Butt | |
| 2005/0044197 A1 * | 2/2005 | Lai | 709/223 |
| 2005/0086197 A1 * | 4/2005 | Boubez et al. | 707/1 |
| 2007/0038703 A1 * | 2/2007 | Tendjoukian et al. | 709/206 |
| 2008/0049779 A1 * | 2/2008 | Hopmann et al. | 370/431 |

OTHER PUBLICATIONS

"GoToMyPC User Guide Version 6.1," http://support.gotomypc.com/ics/support/default.asp?deptID=5647&task=download, Jun. 2, 2009.

"LANDesk Instant Support Suite Pro 2.0, Console User's Guide," http://www.landesk.com/docs/productdocs/iss_pro/enuissugp.pdf, Jun. 2, 2009.

* cited by examiner

*Primary Examiner*—Kyung-Hye Shin
(74) *Attorney, Agent, or Firm*—Austin Rapp & Hardman

(57) ABSTRACT

A method for managing a computer over a network is disclosed. The method may be implemented by a resident agent on the network. A connection between the resident agent and a sending application may be opened. Application data may be received from the sending application by the resident agent. A header may be received from the sending application by the resident agent. Whether a data package should be sent directly to a receiving application or whether the data package should be sent through a gateway may be determined. If it is determined that the data package should be sent directly to a receiving application, the data package may be sent directly to the receiving application. If it is determined that the data package should be sent through the gateway, the data package may be sent through the gateway.

23 Claims, 10 Drawing Sheets

SYSTEMS AND METHODS FOR MANAGING A COMPUTER OVER A NETWORK

TECHNICAL FIELD

The present invention relates generally to computers and computer-related technology. More specifically, the present invention relates to systems and methods for managing a computer over a network.

BACKGROUND

Computer and communication technologies continue to advance at a rapid pace. Indeed, computer and communication technologies are involved in many aspects of a person's day. Computers commonly used include everything from hand-held computing devices to large multi-processor computer systems.

Computers are used in almost all aspects of business, industry and academic endeavors. More and more homes are using computers as well. The pervasiveness of computers has been accelerated by the increased use of computer networks, including the Internet. Most companies have one or more computer networks and also make extensive use of the Internet. The productivity of employees often requires human and computer interaction. Improvements in computers and software have been a force for bringing about great increases in business and industrial productivity.

Maintaining and supporting computer systems is important to anyone who relies on computers. Whether a computer or computing device is in a home or at a business, at least some maintenance and/or support is often needed. For example, sometimes there are problems with computer hardware. In addition, computer hardware is often upgraded and replaced with new components. Similarly computer software is also frequently upgraded or replaced. New computer hardware and software is continually being integrated into systems across the world.

Installing new computer hardware and/or software, or fixing problems with existing systems, may cause down-time during which the business or individual operates at a diminished level. Most individuals and businesses try to minimize computer problems so as to avoid down-time.

When a business or individual is trying to decide whether to make a change to a computer system, the concern about down-time may outweigh the cost of the installation or change in influencing the decision. The professional computer service industry which carries out and supports installations and upgrades has been rapidly expanding. However, even with such computer professional support, the threat of such down-time coupled with the costs of such professional services is a concern.

As corporate performance and end-user productivity have become increasingly dependent on computers, computer support personnel are continuously under pressure to accomplish more with existing or reduced staff head counts. They are also under pressure to perform tasks as efficiently as possible which may include minimizing effects to existing computer systems and networks.

As shown from the above discussion, there is a need for systems and methods that will improve the ability to manage and support computer systems. Improved systems and methods may enable a person performing computer support to work more efficiently and accomplish more in less time. Benefits may be realized by providing increased functionality to assist in computer maintenance and support.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
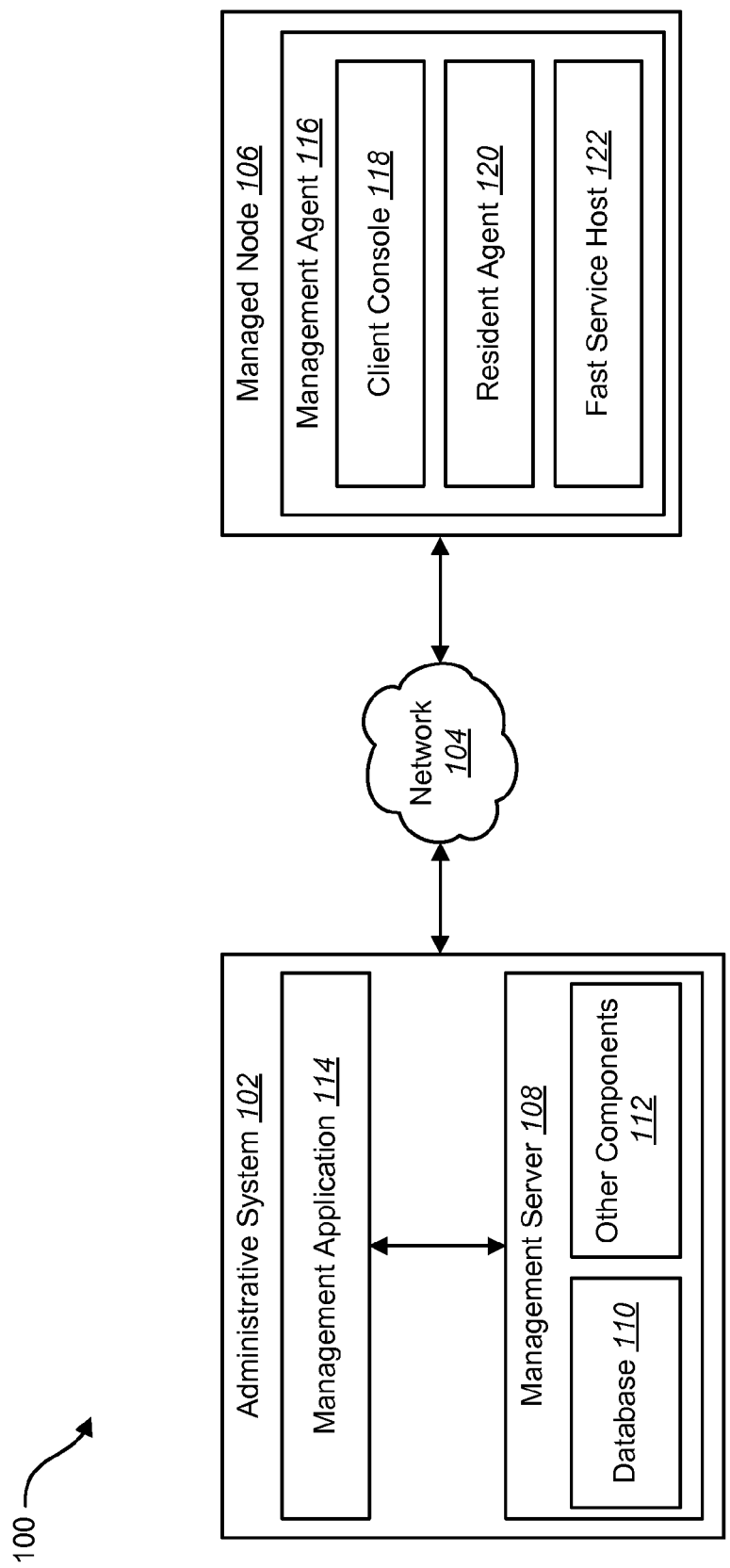
FIG. 1 illustrates an exemplary system in which embodiments may be practiced, including a resident agent.

A method for managing a computer over a network is disclosed. The method is implemented by a resident agent on the network. A connection between the resident agent and a sending application is opened. Application data is received from the sending application by the resident agent. A header is received from the sending application by the resident agent. Whether a data package should be sent directly to a receiving application or whether the data package should be sent through a gateway is determined. If it is determined that the data package should be sent directly to a receiving application, the data package is sent directly to the receiving application. If it is determined that the data package should be sent through the gateway, the data package is sent through the gateway.

A computer system that is configured to implement a method for managing a computer over a network is disclosed. The computer system includes a processor. The computer system includes memory in electronic communication with the processor. The computer system includes instructions stored in the memory. The instructions are executable to perform various functions. The instructions are executable to open a connection between the resident agent and a sending application. The resident agent receives application data from the sending application. The resident agent receives a header from the sending application. Whether a data package should be sent directly to a receiving application or whether the data package should be sent through a gateway is determined. If it is determined that the data package should be sent directly to a receiving application, the data package is sent directly to the receiving application. If it is determined that the data package should be sent through the gateway, the data package is sent through the gateway.

A non-transitory computer-readable medium is disclosed. The non-transitory computer-readable medium includes executable instructions for managing a computer over a network. The instructions are executable to perform various functions. The instructions are executable to open a connection between the resident agent and a sending application. The resident agent receives application data from the sending application. The resident agent receives a header from the sending application. Whether a data package should be sent directly to a receiving application or whether the data package should be sent through a gateway is determined, if it is determined that the data package should be sent directly to a receiving application, the data package is sent directly to the receiving application. If it is determined that the data package should be sent through the gateway, the data package is sent through the gateway.

In some embodiments, the data package is sent via a sending port. In further embodiments, the sending port is a port that allows the data package to pass through firewalls. In still further embodiments, the sending port is port 443.

In some embodiments, the application data is inventory data. In further embodiments, the resident agent packages the application data and the header into the data package and sends the data package from the resident agent to the gateway.

In some embodiments, an HTTPS session is begun with the gateway. In further embodiments, packaging the application data and the header includes wrapping the application data with an HTTP header.

In today's IT environments there is a need to communicate with computing devices, computers, and/or machines that may be temporarily or permanently outside a corporate network. Firewalls often block most network traffic traveling into a corporate network. Therefore, firewalls often hinder standard client/server architecture. Port 443 is commonly open to allow SSL network traffic to pass through firewalls. In order to send application data through a firewall, typically the application needed to be significantly modified. Benefits may be realized by providing systems and methods for managing a computer over a network such that the applications do not need these significant modifications.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

FIG. 1 illustrates an exemplary system 100 in which embodiments may be practiced. An administrative computer system 102 may be connected to a computer network 104, such as a local area network (LAN). The administrative system 102 may be used to manage other computer systems that are also connected to the computer network 104. These other computer systems will be referred to herein as "managed nodes." For simplicity, only a single managed node 106 is shown in the system 100 of FIG. 1. Of course, the systems in which embodiments disclosed herein are practiced may include many additional managed nodes.

The administrative system 102 includes a management server 108. The management server 108 may include a database 110 of information. The management server 108 may also include various other components 112 that may be configured to perform tasks such as scheduling, handling alerts, and so forth. An example of a management server 108 that may be used with embodiments disclosed herein is the core server for the LANDesk® Management Suite.

The administrative system 102 may also include a management application 114. The management application 114 may be used to perform various tasks related to the management of the computer network 104, such as remote control, software distribution, software license monitoring, operating system imaging and migration, IT asset management, problem resolution, and so forth. As part of performing these tasks, the management application 114 may connect to the management server 108 and query the management server 108 for information. An example of a management application 114 that may be used is the console application for the LANDesk® Management Suite. Another example of a management application 114 that may be used is the LANDesk® Management Gateway.

To enable a user of the administrative system 102 to perform management tasks via the management application 114, the managed node 106 may include a management agent 116. The management agent 116 may perform management-related tasks in response to requests from the management application 114. The management agent 116 may periodically contact the administrative system 102 for management requests. An example of a management agent 116 that may be used is the LANDesk® Management Agent.

The administrative system 102 may include a gateway. The managed node 106 may be a sending or receiving managed node. The resident agent 120 is described below as either a sending or a receiving agent. The managed nodes 106 may include sending and/or receiving applications and sending and/or receiving agents.

Figure 2:
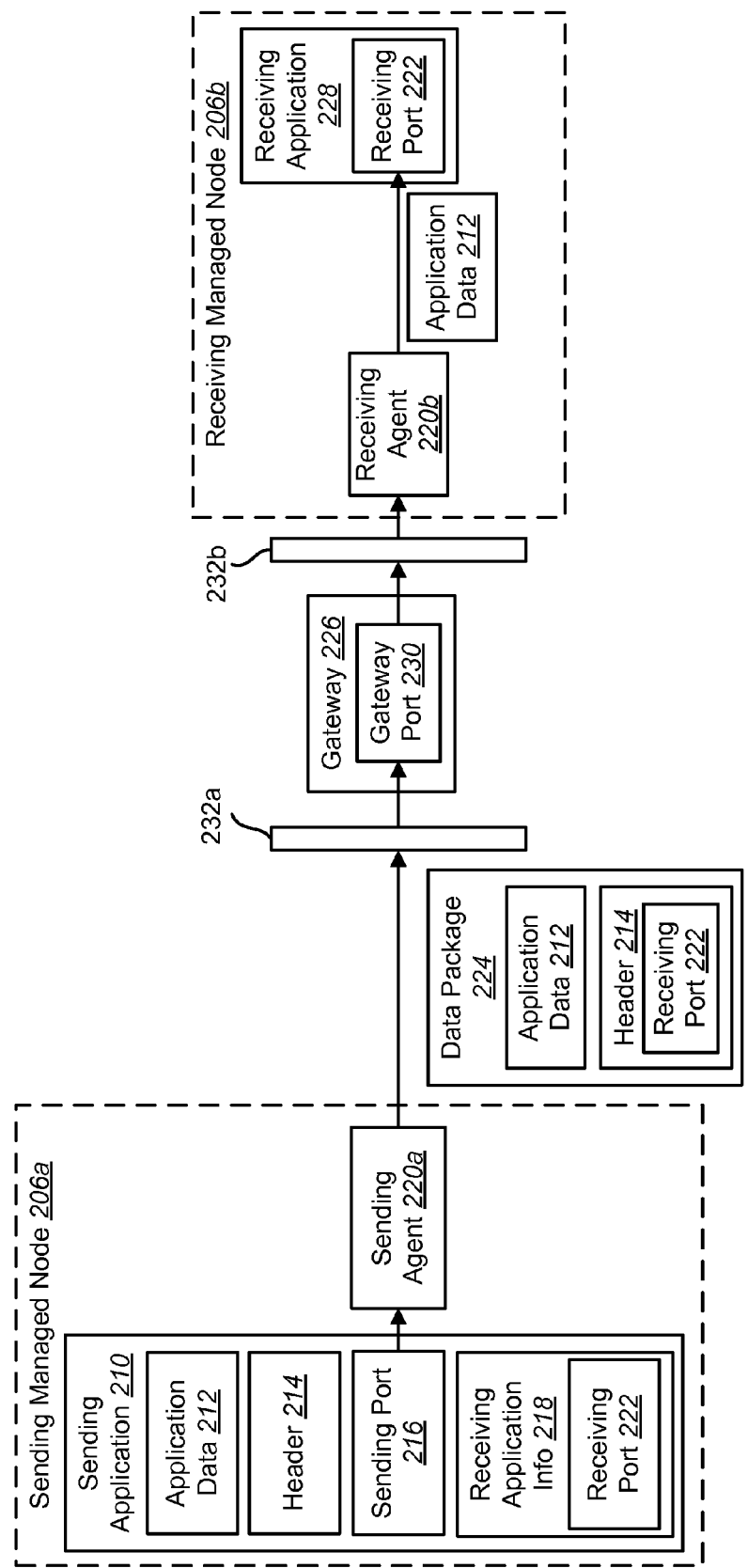
FIG. 2 illustrates the operation of a sending agent according to an embodiment.

FIG. 2 illustrates the operation of a sending agent 220*a* according to an embodiment. The sending application 210 may be included in a sending managed node 206*a*. The sending application 210 may include application data 212. Application data 212 may include inventory data, such as hardware and software inventory information. Application data 212 may also include software license data, such as which software licenses are enabled on which management nodes 206a, 206b. Application data 212 may include remote control application data, such as remote desktop information, file transfer data, chat session data, screen draw data, remote execution, or remote reboot data. Application data 212 may also include security data such as patch management data, software update data, custom application definitions, anti-spyware management data, security threat data, blocked application data, anti-virus definitions, or other data to be used by the receiving application. Application data 212 may further include software distribution data, application settings, etc.

The sending application 210 may also include receiving application information 218. The receiving application information 218 may include information about a receiving application 228 on the receiving managed node 206b, such as a receiving port 222 of the receiving application 228 or the address of the receiving application 228. The sending application 210 may use the receiving application information 218 to generate a header 214. The header 214 may be a communications message header, such as a HTTP header, an email header, etc.

The sending application 210 may be in electronic communication with a sending port 216 of the sending managed node 206a for sending and receiving data, such as the application data 212. In some embodiments, the sending port 216 is port 443 and may be used to send and receive SSL network traffic through firewalls. In other embodiments, the port may be another port that may allow access through a firewall.

The header 214 may be used to identify the receiving application 228 and may also identify the receiving port 222 on which the receiving application 228 transmits and receives data. For example, the header 214 may include the IP address and receiving port 222 of the receiving application 228 to which application data 212 should be sent. In other embodiments, the sending application 228 may send the application data 212 to the receiving application 228 directly based on the receiving application information 218.

The sending agent 220a may be in electronic communication with the sending application 210 and a gateway 226. In some embodiments, the sending agent 220a is in electronic communication with the sending port 216 of the sending managed node 206a and a gateway port 230 of the gateway 226. The sending agent 220a may receive application data 212 from the sending application 210. The sending agent 220a may also receive receiving application information 218 such as the receiving port 222 of the receiving application 228. The sending agent 220a may receive a header 214 from the sending application 210.

The sending agent 220a may package the application data 212 into a data package 224 such that the data package 224 may pass through a firewall 232a, 232b. The sending agent 220a may send the data package 224 to the gateway 226. In some embodiments, the data package 224 may be sent via port 443, such that the data package 224 may pass through any firewalls 232a, 232b to the gateway port 230, which may also be port 443. The sending agent 220a will be discussed in more detail in connection with FIG. 5.

The data package 224 that is sent to the gateway 226 may include the application data 212 and the header 214 from the sending application 210. In the present embodiment, the header 214 includes the receiving port 222 of the receiving application 228 on the receiving managed node 206b. The data package 224 may include other data to be sent through the firewalls 232a, 232b to a receiving managed node 206b.

The gateway 226 may receive the data package 224. In some embodiments, the gateway 226 receives the data package 224 after the data package 224 passes through the firewall 232a. The gateway 226 may be a part of an administrative system 102. The gateway 226 may include the gateway port 230. In some embodiments, the gateway port 210 is port 443. The gateway 226 may inspect the data package 224 to determine where to send the data package 224. In one embodiment, the gateway 226 inspects the header 214 to determine where to send the data package 224. The gateway 226 may send the data package 224 such that it passes through a firewall 232b to a receiving agent 220b. In some embodiments, both or one of the firewalls 232a, 232b may be omitted from the network 104.

The receiving agent 220b may be in electronic communication with the gateway 226 and the receiving application 228. The receiving agent 220b may be in electronic communication with the receiving port 222 of the receiving managed node 206b. The receiving port 222 may be used to facilitate communication between the receiving application 228 and the receiving agent 220b. In some embodiments, the receiving port 222 may be used by the receiving application 228 or the receiving agent 220b on the receiving managed node 206b to send or receive data. For example, the data package 224 may be received by the receiving agent 220b via the receiving port 222. The application data 212 may be sent by the receiving agent 220b and received by the receiving application 228 via the receiving port 222. In other embodiments, other ports may be used for similar functions. The receiving agent 220b may receive the data package 224 from the gateway 226. The receiving agent 220b may unpackage the data package 224 and send the data package 224 to the receiving port 222 of the receiving application 228 on the receiving managed node 206b where the receiving application 228 may receive the application data 212.

The previous embodiment has been described in terms of sending and receiving applications 210, 228, sending and receiving agents 220a, 220b, and sending and receiving managed nodes 206a, 206b. In some embodiments, both ports 216, 222 may send and receive data on either managed node 206a, 206b Likewise, both applications 210, 228 may send and receive application data 212 and may generate, send, and receive headers 214. Furthermore, both agents 220a, 220b may send, package, unpackage, and receive application data 212 and headers 214. Additionally, both agents 220a, 220b may simultaneously send, package, unpackage, and receive application data 212, headers 214, or any other data.

Figure 3:
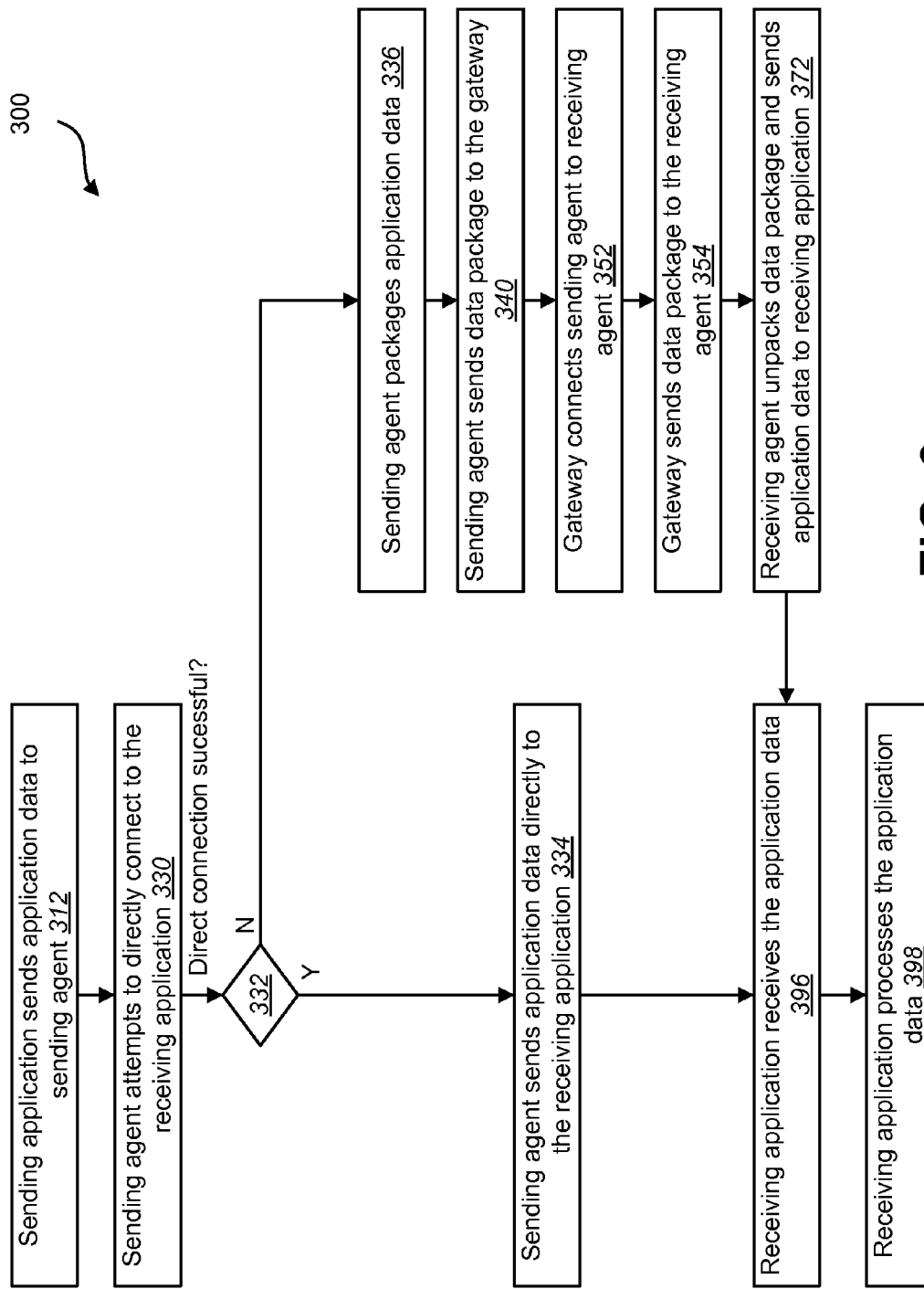
FIG. 3 is a flow diagram of one embodiment of a method for managing a computer over a network.

FIG. 3 is a flow diagram illustrating one embodiment of a method 300 for managing a computer over a network 104. A sending application 210 may send 312 application data 212 to a sending agent 220a. The sending application 210 may also send a header 214 that may include the receiving application information 218, including the receiving port 222 of the receiving application 228.

The sending agent 220a may receive the application data 212 and header 214. The sending agent 220a may attempt 330 to directly connect to the receiving application 228. The sending agent 220a may determine 332 whether the attempted direct connection to the receiving application 228 was successful. If the direct connection to the receiving application 228 was successful, the sending agent 220a may send 334 the application data 212 directly to the receiving application 228, whereby the receiving application 228 may receive 396 the application data 212.

If the direct connection to the receiving application 228 is not successful, the sending agent 220a may package 336 the application data 212. The sending agent 220a may send 340 the data package 224 through a firewall 232a to the gateway 226. The gateway 226 may connect 352 the sending agent 220a with the receiving agent 220b. The gateway 226 may receive the data package 224 and send 354 the data package 224 to the receiving agent 220b. The receiving agent 220b may unpackage 372 the data package 224 and send the application data 212 to the receiving application 228. The receiving application 228 may receive 396 the application data 212 from the receiving agent 220b. The receiving application 228 may process 398 the application data 212.

Figure 4:
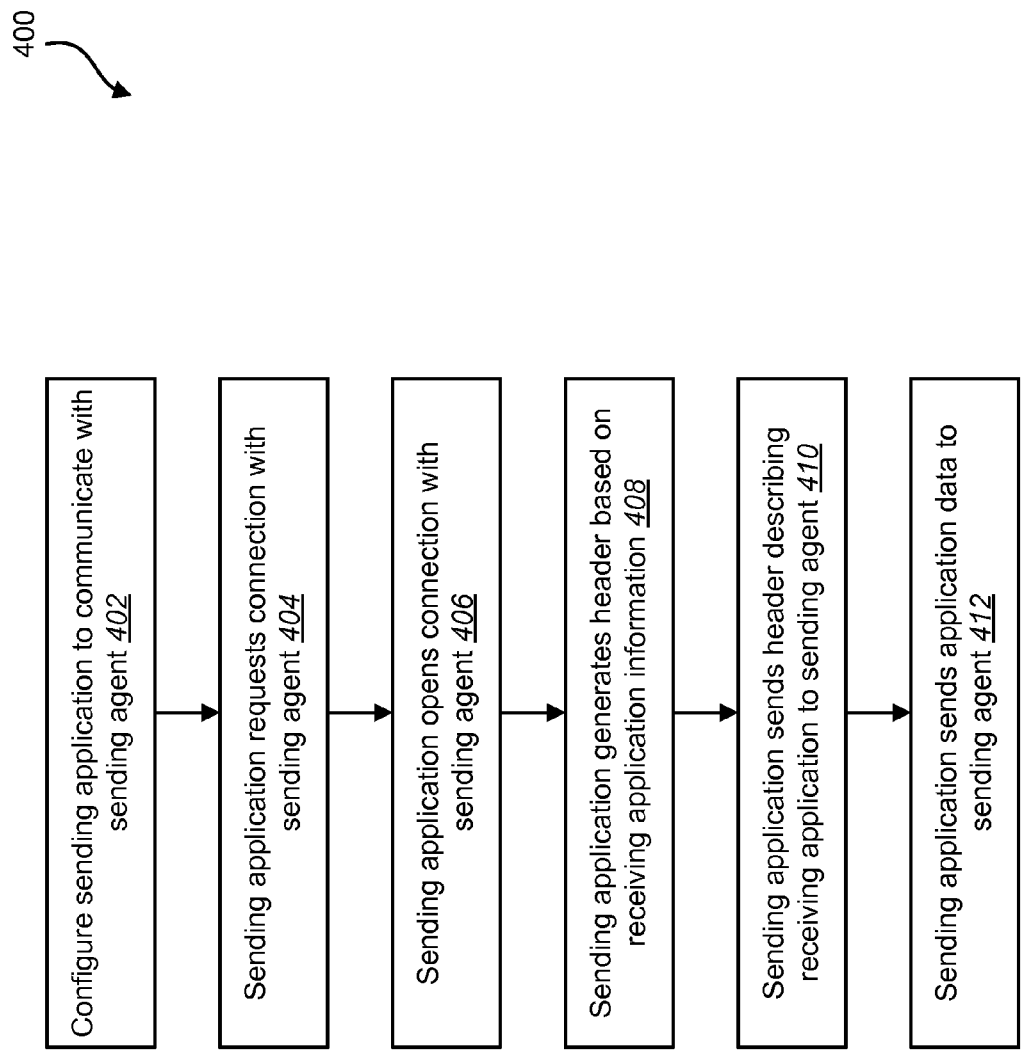
FIG. 4 is a flow diagram of one embodiment of a method of operation of a sending application.

FIG. 4 illustrates a method 400 which shows the operation of a sending application 210 according to an embodiment. The sending application 210 may be configured 402 to communicate with the sending agent 220a. Configuring 402 the sending application 210 to communicate with the sending agent 220a may include establishing communications protocols to facilitate communication between the sending application 210 and sending agent 220a. The sending application 210 may request 404 a connection to the sending agent 220a. The sending application 210 may open 406 a connection with the sending agent 220a.

The sending application 210 may generate 408 a header 214 based on the receiving application information 218. In some embodiments the sending agent 220a may automatically generate the header 214 if the header 214 is not provided by the sending application 210. Generating 408 a header 214 may include generating a header 214 and storing a source address and a destination address and/or storing the protocol to be used in the header 214. In some embodiments, the source address is the IP address of the sending managed node 206a and the sending port 220a and the destination address is the IP address of the receiving managed node 206b and the receiving port 222. Other information may also be stored in the generated header 214.

The sending application 210 may send 410 the header 214 to the sending agent 220a. The sending application 210 may send 412 the application data 212 to the sending agent 220a. As discussed above, application data 212 may include various types of data, such as inventory data, software license data, remote control application data, security data, software distribution data, etc. The sending application 210 may send 410, 412 both the header 214 and the application data 212 to the sending agent 220a via the sending port 216. In some embodiments, the sending application 210 sends 410, 412 the header 214 and application data 212 using HTTP.

Figure 5:
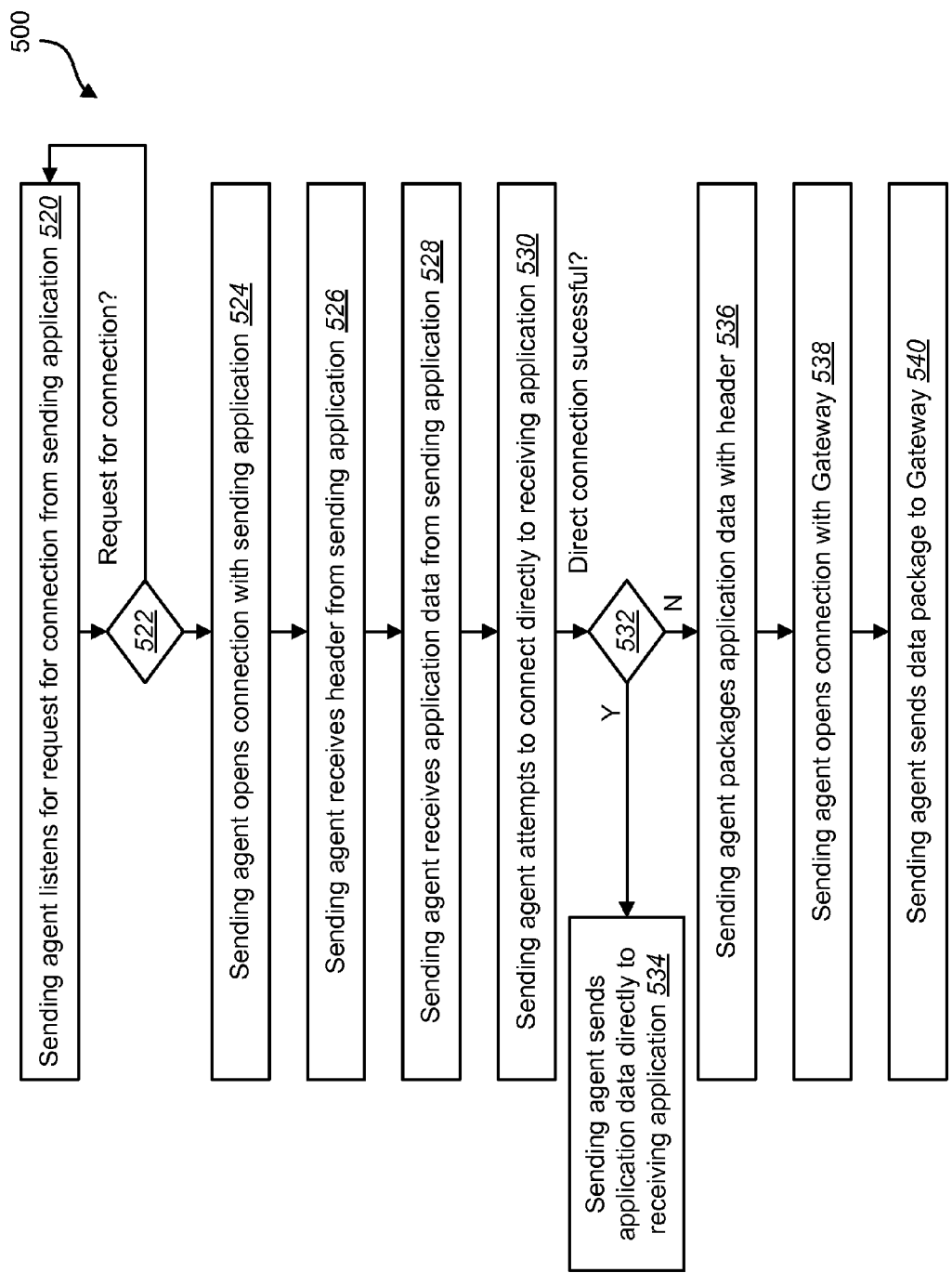
FIG. 5 illustrates a method which shows the operation of a sending agent according to an embodiment.

FIG. 5 illustrates a method 500 which shows the operation of a sending agent 220a according to an embodiment. The sending agent 220a may listen 520 for a request for a connection from the sending application 210. The sending agent 220a may listen 520 on the sending port 216 on the sending managed node 206a. The sending agent 220a may determine 522 whether a request for a connection from the sending application 210 has been received. In some embodiments, a request for a connection may take the form of a header 214 that is sent to the sending agent 220a. If the sending agent 220a determines 522 that a request for a connection from the sending application 210 has not been received, the sending agent 220a may continue to listen 520 for a request for a connection from the sending application 210.

If the sending agent 220a determines 522 that a request for a connection from the sending application 210 has been received, the sending agent 220a may open 524 a connection with the sending application 210. This connection may be opened 524 via the sending port 216. In some embodiments, the sending port 216 is port 443. In other embodiments, any port may be used to establish a connection between the sending application 210 and the sending agent 220a. The sending agent 220a may receive 526 a header 214 from the sending application 210. The sending agent 220a may receive 528 application data 212 from the sending application 210.

The sending agent 220a may attempt 530 to directly connect to the receiving application 228. A direct connection to the receiving application 228 may simply be a connection without any firewalls 232a, 232b. The sending agent 220a may determine 532 whether the attempt 530 to directly connect to the receiving application 228 was successful. If the connection was successful, the sending agent 220a may send 534 the application data 212 directly to the receiving application 228. The sending agent 220a may use the receiving application information 218 stored in the header 214 to determine how to send the application data 212 directly to the receiving application 228. For example, the header 214 may contain the IP address of the receiving managed node 206b and the receiving port 222 where the receiving agent 220b or receiving application 228 is listening for a connection. Sending 534 the application data 212 to the receiving application 228 may include sending the application data 212 directly to the IP address and receiving port 222 specified in the header 214.

If the connection was not successful, the sending agent 220a may package 536 the application data 212 with the header 214. Packaging 536 the application data 212 may include wrapping the application data 212 by adding the header 214 to the application data 212 to create a data package 224. For example, the header 214 may be an HTTP header, such that the data package 224 includes the application data 212 wrapped with the HTTP header as the header 214. Wrapping the application data 212 with a header 214 may allow the data package 224 to pass through firewalls 232a, 232b where simply sending the application data 212 may be blocked by the firewalls 232a, 232b. In some embodiments, the header 214 specifies that the receiving port 222 is port 443 so that when the application data 212 is wrapped in the header 214 the data package 224 may pass through the firewalls 232a, 232b because communications sent to and received by port 443 typically may pass directly through a firewall 232a, 232b.

The sending agent 220a may open 538 a connection to the gateway 226. Opening 538 a connection to the gateway 226 may include requesting a connection with the gateway 226. In some embodiments, opening 538 a connection to the gateway 226 includes beginning an HTTPS session with the gateway 226. The sending agent 220a may send 540 the data package 224 to the gateway 226 via the gateway port 230. Sending 540 the data package 224 may include sending the data package 224 through a firewall 232b. The data package 224 may be sent 540 via the gateway port 230.

Figure 6:
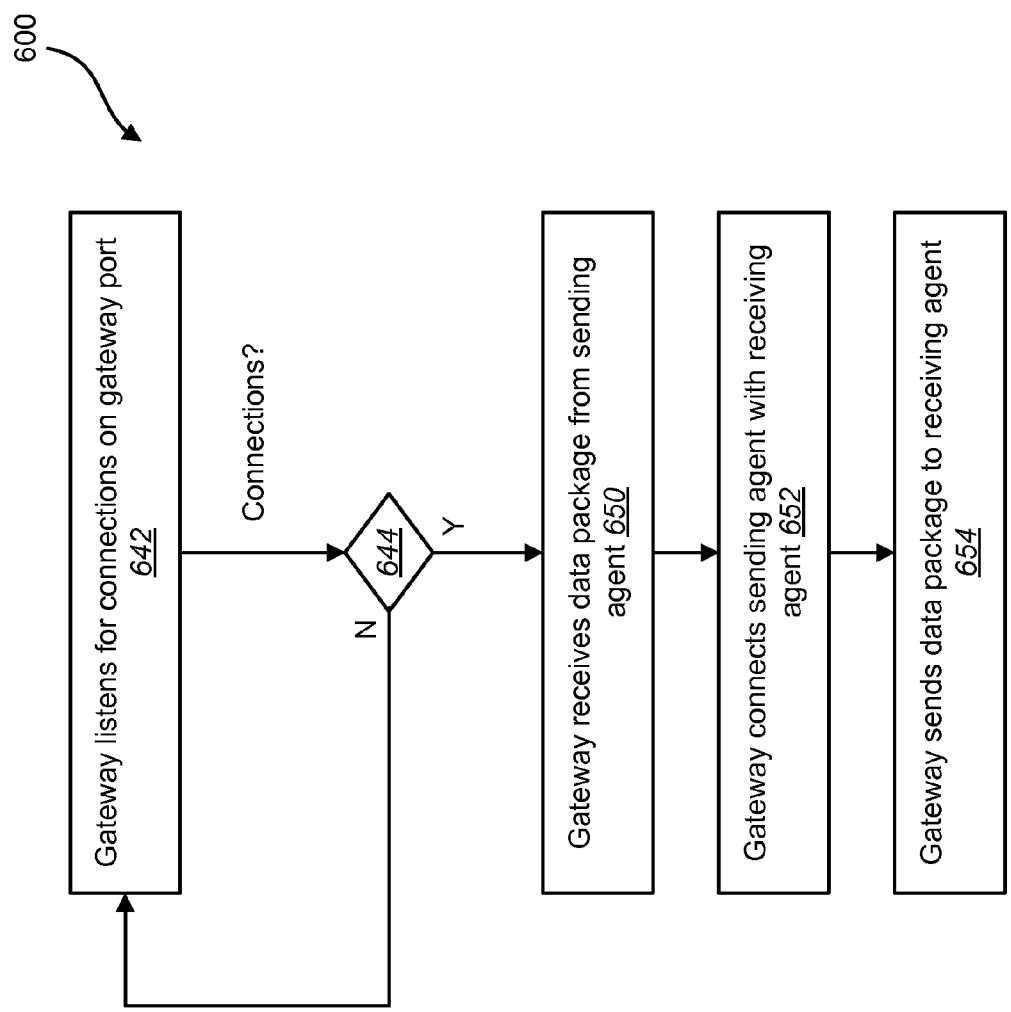
FIG. 6 illustrates a method which shows the operation of a gateway according to an embodiment.

FIG. 6 illustrates a method 600 which shows the operation of a gateway 226 according to an embodiment. The gateway 226 may listen 642 for connections on the gateway port 230. In some embodiments, the gateway port 230 is port 443. In other embodiments, the gateway port 230 is another port that may allow access through a firewall 232b. The gateway 226 may determine 644 whether a connection has been opened on the gateway port 230. Connections may be received from a sending agent 220a and/or a receiving agent 220b. Connections may be HTTPS sessions. In some embodiments, determining 644 whether a connection exists on the gateway port 230 may include listening for an attempt by an agent 220a, 220b to begin an HTTPS session with the gateway 226. If the gateway 226 determines 644 that a connection does not exist on the gateway port 230, the gateway 226 may continue to listen 642 for a connection on the gateway port 230. Connections may be opened between the gateway port 230 and the sending port 216 on the sending managed node 206a and the gateway port 230 and the receiving port 222 on the receiving managed node 206b.

If the gateway 226 determines 644 that a connection does exist on the gateway port 230, the gateway 226 may receive 650 the data package 224 from the sending agent 220a. The data package 224 may be received 650 through the gateway port 230. The gateway 226 may connect 652 the sending agent 220a with the receiving agent 220b. In some embodiments, connecting 652 the sending agent 220a with the receiving agent 220b may include connecting an HTTPS session between the gateway 226 and the sending agent 220a with an HTTPS session between the gateway 226 and the receiving agent 220b.

The gateway 226 may send 654 the data package 224 to the receiving agent 220b. Sending 654 the data package 224 may require sending the data package 224 through a firewall 232b to the receiving agent 220b. In some embodiments, the data package 224 is sent 654 via port 443, such that the data package 224 may pass through any firewalls 232a, 232b. In some embodiments, sending 654 and receiving 650 the data package 224 may be accomplished over the connection between the sending agent 220a and the receiving agent 220b, such that the gateway 226 is merely acting as an intermediary rather than actively sending 654 or receiving 650 the data package 224.

Figure 7:
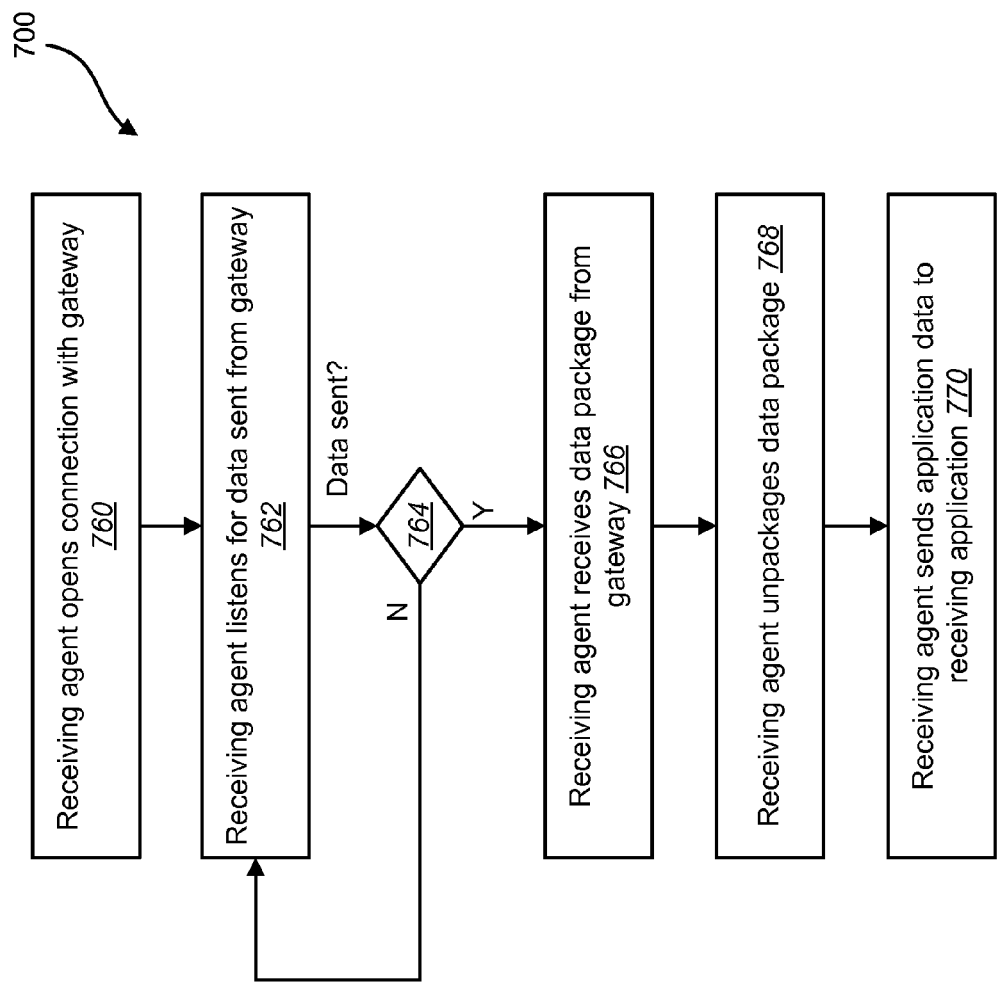
FIG. 7 illustrates a method which shows the operation of a receiving agent according to an embodiment.

FIG. 7 illustrates a method 700 which shows the operation of a receiving agent 220b according to an embodiment. The receiving agent 220b may open 760 a connection with the gateway 226. The connection may be opened 760 between the gateway port 230 and the receiving port 222 on the receiving managed node 206b. In some embodiments, the gateway port 230 and the receiving port 222 are both port 443. Opening 760 a connection between the receiving agent 220b and the gateway 226 may include opening the connection through a firewall 232a, 232b. This may be accomplished by beginning an HTTPS session with the gateway 226.

The receiving agent 220b may listen 762 for data sent from the gateway 226. In some embodiments, the receiving agent 220b may listen 762 for a data package 224 and/or application data 212 sent to the receiving port 222 on the receiving managed node 206b. In other embodiments, the receiving agent 220b may listen 762 for any data sent to the receiving port 222 on the receiving managed node 206b.

The receiving agent 220b may determine 764 whether data from the gateway 226 has been sent. If the receiving agent 220b determines 764 that data has not been sent, the receiving agent 220b may continue to listen 762 for data sent from the gateway 226. As discussed above, the receiving agent 220b may also act as a sending agent 220a, in which case the receiving agent 220b may also listen for data, but the data may be sent from the receiving application 228 acting as a sending application 210 rather than from the gateway 226. If the receiving agent 220b determines 764 that data from the gateway 226 has been sent, the receiving agent 220b may receive 766 the data package 224 from the gateway 226.

The receiving agent 220b may unpackage 768 the data package 224. Unpackaging 768 the data package 224 may include unwrapping the application data 212 by removing the header 214 from the data package 224. For example, the data package 224 may be unwrapped by removing an HTTP header. The receiving agent 220b may send 770 the application data 224 to the receiving application 228 via the receiving port 222.

Figure 8:
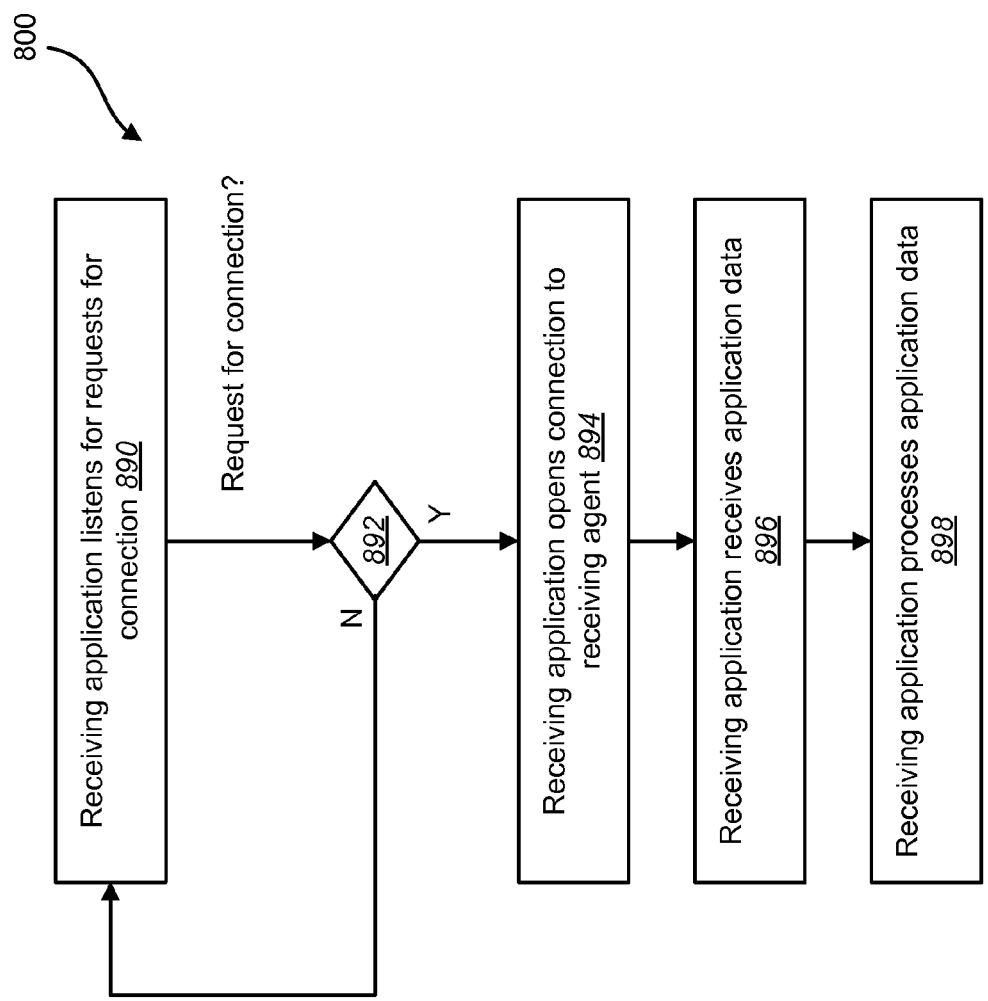
FIG. 8 illustrates a method which shows the operation of a receiving application according to an embodiment.

FIG. 8 illustrates a method 800 which shows the operation of a receiving application 228 according to an embodiment. The receiving application 228 may listen 890 for a request for a connection from the receiving agent 220b. The receiving application 228 may determine 892 whether a request for a connection from the receiving agent 220b has been received.

If the receiving application 228 determines 892 that a request for a connection from the receiving agent 220b has not been received, the receiving application 228 may continue to listen 890 for a request for a connection from the receiving agent 220b. The receiving application 228 may listen 890 on the receiving port 222 on the receiving managed node 206b.

If the receiving application 228 determines 892 that a request for a connection from the receiving agent 220b or from the sending agent 220a has been received, the receiving application 228 may open 894 a connection with the receiving agent 220b or the sending agent 220a. The receiving application 228 may receive 896 the application data 212 from the receiving agent 220b or the sending agent 220a. The receiving application 228 may process 898 the application data 212. Processing 898 the application data 212 may include, for example, storing the application data 212 in a database. Another example of processing 898 the application data 212 is installing a patch In some embodiments, processing 898 application data 212 may include storing any inventory data, software license data, patch management data, software update data, custom application definitions, anti-spyware management data, remote desktop information, file transfer data, chat session data, screen draw data, security threat data, blocked application data, anti-virus definitions, software distribution data, or application settings in an appropriate database or other location.

In other embodiments, processing 898 application data 212 may include installing or deploying any desired patches, software updates, custom application definitions, anti-spyware management data, anti-virus definitions, software distribution data, or application settings. In further embodiments, processing 898 application data 212 may include displaying remote desktop information, chat session data, screen draw data, on a monitor or other display device. In still further embodiments, processing 898 application data 212 may include remotely executing any remote data.

Though, in many of the described embodiments, operations performed using a port are described as using either the sending port 216 or the receiving port 222, the data may be sent between applications 210, 228 and agents 220a, 220b on the managed nodes 206a, 206b using any port. Typically, data that is sent from or received by a managed node 206a, 206b is sent or received via a port that may allow data to pass through a firewall 232a, 232b. In some cases, the data is sent or received via port 443.

Figure 9:
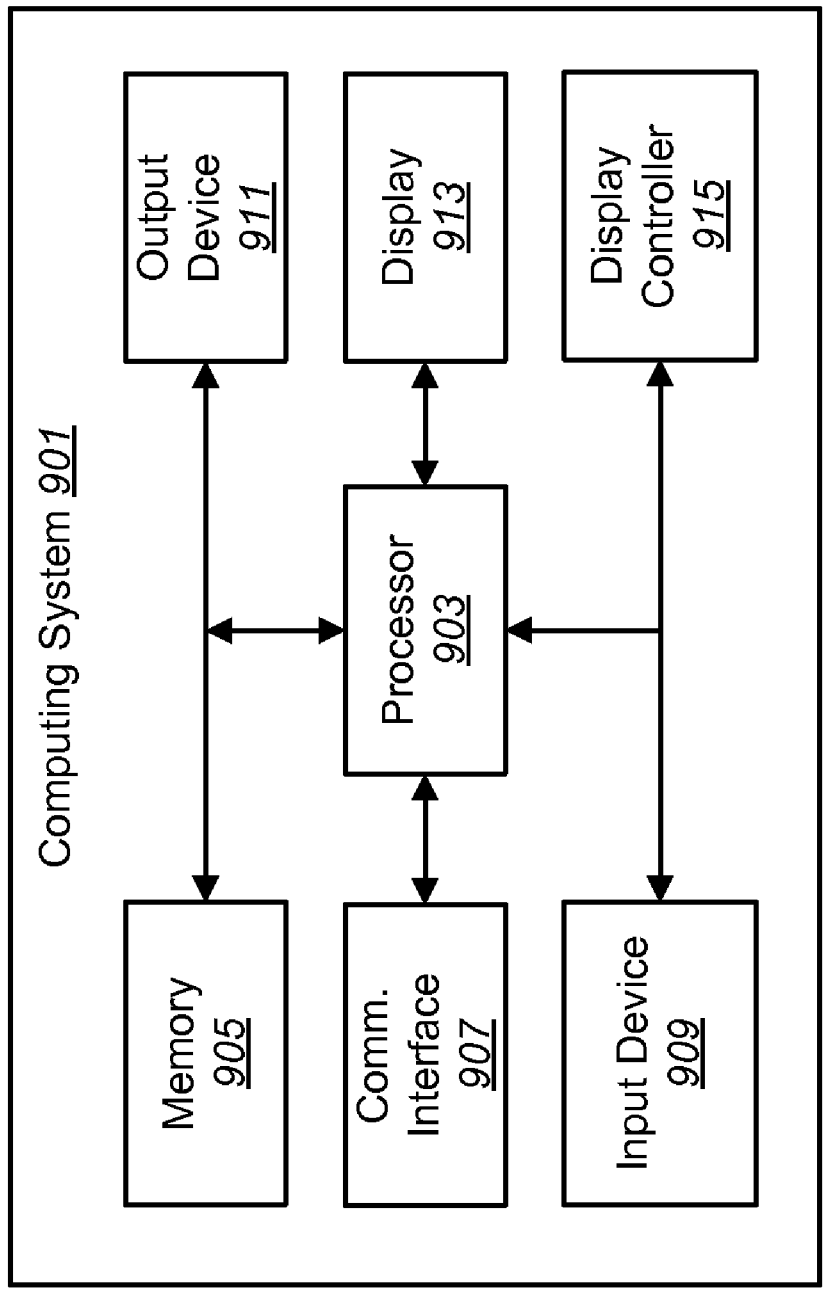
FIG. 9 is a block diagram illustrating the major hardware components typically utilized in a computer system.

FIG. 9 is a block diagram illustrating the major hardware components typically utilized in a computer system 901. The illustrated components may be located within the same physical structure or in separate housings or structures. The sending and receiving managed nodes 206a, 206b and the administrative system 102 may incorporate many of the components of the computer system 901.

The computer system 901 includes a processor 903 and memory 905. The processor 903 controls the operation of the computer system 901 and may be embodied as a microprocessor, a microcontroller, a digital signal processor (DSP) or other device known in the art. The processor 903 typically performs logical and arithmetic operations based on program instructions stored within the memory 905.

As used herein, the term memory 905 is broadly defined as any electronic component capable of storing electronic information, and may be embodied as read only memory (ROM), random access memory (RAM), magnetic disk storage media, optical storage media, flash memory devices in RAM, on-board memory included with the processor 903, EPROM memory, EEPROM memory, registers, etc. The memory 905 typically stores program instructions and other types of data. The program instructions may be executed by the processor 903 to implement some or all of the methods disclosed herein.

The computer system 901 typically also includes one or more communication interfaces 907 for communicating with other electronic devices. The communication interfaces 907 may be based on wired communication technology, wireless communication technology, or both. Examples of different types of communication interfaces 907 include a serial port, a parallel port, a Universal Serial Bus (USB), an Ethernet adapter, an IEEE 1394 bus interface, a small computer system interface (SCSI) bus interface, an infrared (IR) communication port, a Bluetooth wireless communication adapter, and so forth.

The computer system 901 typically also includes one or more input devices 909 and one or more output devices 911. Examples of different kinds of input devices 909 include a keyboard, mouse, microphone, remote control device, button, joystick, trackball, touchpad, lightpen, etc. Examples of different kinds of output devices 911 include a speaker, printer, etc. One specific type of output device which is typically included in a computer system is a display device 913. Display devices 913 used with embodiments disclosed herein may utilize any suitable image projection technology, such as a cathode ray tube (CRT), liquid crystal display (LCD), light-emitting diode (LED), gas plasma, electroluminescence, or the like. A display controller 915 may also be provided, for converting data stored in the memory 905 into text, graphics, and/or moving images (as appropriate) shown on the display device 913.

Of course, FIG. 9 illustrates only one possible configuration of a computer system 901. Various other architectures and components may be utilized.

Figure 10:
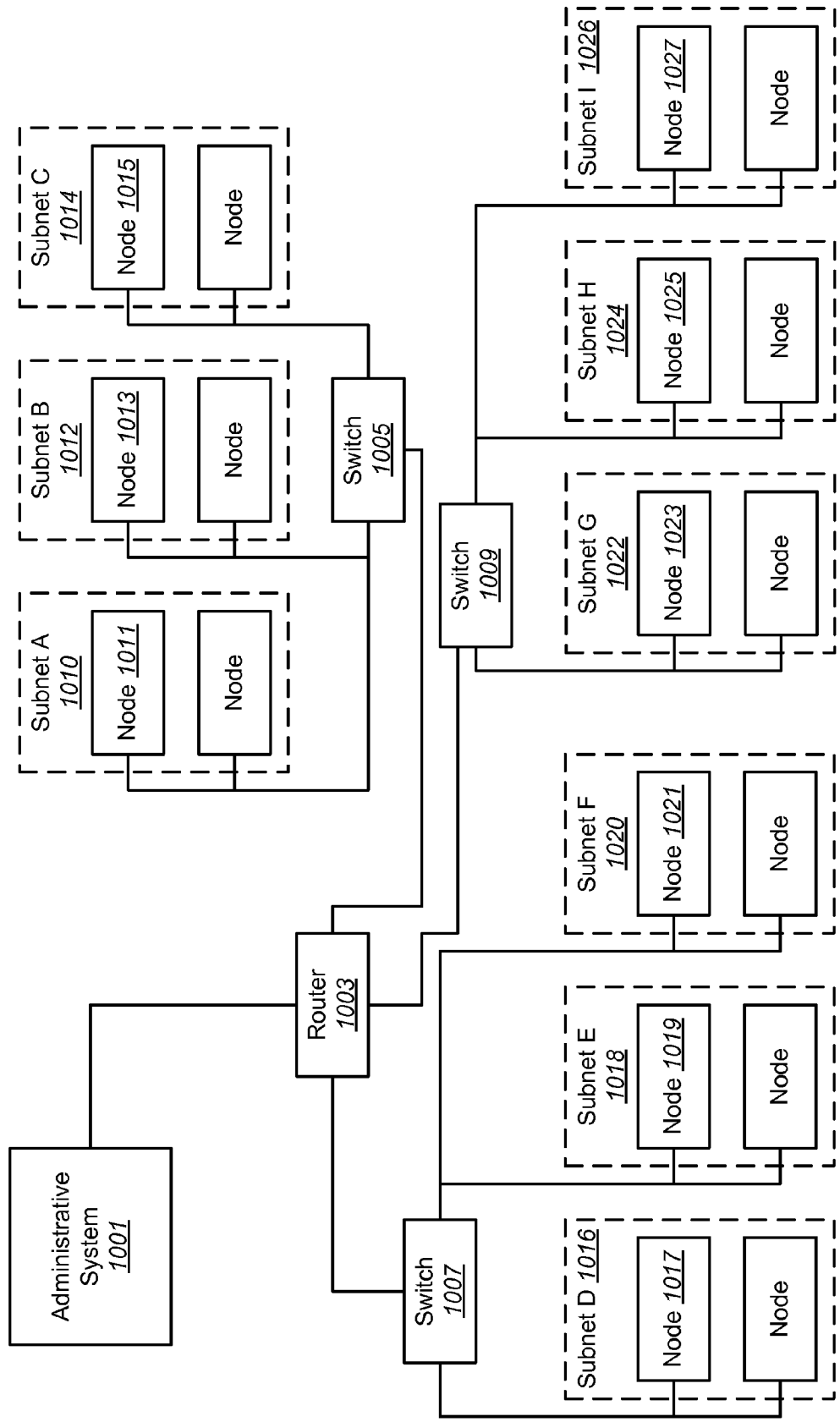
FIG. 10 is an exemplary block diagram illustrating a computer network on which the present systems and methods may be implemented.

FIG. 10 is an exemplary block diagram illustrating a computer network 104 on which the present systems and methods may be implemented. In FIG. 10, an administrative system 1001 connects to a router 1003. The administrative system 1001, or administrative node 1001, may be any computer or computing device that has been configured to, or is being used for, receiving notifications from one or more monitors.

The router 1003 may be connected to three switches: a first switch 1005, a second switch 1007 and a third switch 1009. Each switch 1005, 1007, 1009 connects to three subnets. The first switch 1005 connects to three subnets 1010, 1012, and 1014. The second switch 1007 connects to three subnets 1016, 1018, and 1020. The third switch 1009 connects to three subnets 1022, 1024, and 1026. The network nodes or elements 1011, 1013, 1015, 1017, 1019, 1021, 1023, 1025 and 1027 represent computer systems or devices on the computer network. One or more of the nodes may use embodiments of the systems and methods described herein. The network may include both wired and wireless connections to nodes or elements 1011, 1013, 1015, 1017, 1019, 1021, 1023, 1025 and 1027 within the network.

HTTP, FTP, SSH, and other protocols may be used in the network 104. Any connection oriented protocol may be used in conjunction with the gateway 226 and the agents 220a, 220b.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for managing a computer over a network, the method being implemented by a resident agent on the network, the method comprising:

opening a connection between a resident agent and a sending application;

receiving application data from the sending application by the resident agent;

receiving a header from the sending application by the resident agent;

determining if the application data should be sent directly to a receiving application or if the application data should be sent through a gateway, wherein the determination is based on a direct connection attempt with the receiving application, and wherein the connection attempt is made without first connecting via the gateway;

if it is determined that the application data should be sent directly to a receiving application, sending the application data directly to the receiving application; and if it is determined that the application data should be sent through the gateway, sending a data package through the gateway.

2. The method of claim 1, wherein the data package is sent via a sending port.

3. The method of claim 2, wherein the sending port is a port that allows the data package to pass through firewalls.

4. The method of claim 2, wherein the sending port is port 443.

5. The method of claim 1, wherein the method further comprises beginning an HTTPS session with the gateway.

6. The method of claim 1, further comprising the resident agent packaging the application data and the header into the data package and sending the data package from the resident agent to the gateway.

7. The method of claim 6, wherein packaging the application data and the header further comprises wrapping the application data with an HTTP header.

8. The method of claim 1, wherein the application data is inventory data.

9. A computer system that is configured to manage a computer over a network, the computer system comprising:

a processor;

memory in electronic communication with the processor;

instructions stored in the memory, the instructions being executable to:

open a connection between a resident agent and a sending application;

receive application data from the sending application by the resident agent;

receive a header from the sending application by the resident agent;

determine if the application data should be sent directly to a receiving application or if the application data should be sent through a gateway, wherein the determination is based on a direct connection attempt with the receiving application, and wherein the connection attempt is made without first connecting via the gateway;

if it is determined that the application data should be sent directly to a receiving application, send the application data directly to the receiving application; and if it is determined that the application data should be sent through the gateway, send a data package through the gateway.

10. The system of claim 9, wherein the data package is sent via a sending port.

11. The system of claim 10, wherein the sending port is a port that allows the data package to pass through firewalls.

12. The system of claim 10, wherein the sending port is port 443.

13. The system of claim 9, wherein the instructions are further executable to begin an HTTPS session with the gateway.

14. The system of claim 9, wherein the instructions are further executable to package the application data and the header into the data package by the resident agent and send the data package from the resident agent to the gateway.

15. The system of claim 14, wherein packaging the application data and the header further comprises wrapping the application data with an HTTP header.

16. The system of claim 9, wherein the application data is inventory data.

17. A non-transitory computer-readable medium comprising executable instructions for managing a computer over a network, wherein the instructions are executable to:

open a connection between a resident agent and a sending application;

receive application data from the sending application by the resident agent;

receive a header from the sending application by the resident agent, determine if the application data should be sent directly to a receiving application or if the application data should be sent through a gateway, wherein the determination is based on a direct connection attempt with the receiving application, and wherein the connection attempt is made without first connecting via the gateway;

if it is determined that the application data should be sent directly to a receiving application, send the application data directly to the receiving application; and if it is determined that the application data should be sent through the gateway, send a data package through the gateway.

18. The non-transitory computer-readable medium of claim 17, wherein the data package is sent via a sending port.

19. The non-transitory computer-readable medium of claim 18, wherein the sending port is a port that allows the data package to pass through firewalls.

20. The non-transitory computer-readable medium of claim 18, wherein the sending port is port 443.

21. The non-transitory computer-readable medium of claim 17, wherein the instructions are further executable to begin an HTTPS session with the gateway.

22. The non-transitory computer-readable medium of claim 17, wherein the instructions are further executable to package the application data and the header into the data package by the resident agent and send the data package from the resident agent to the gateway.

23. The non-transitory computer-readable medium of claim 22, wherein packaging the application data and the header further comprises wrapping the application data with an HTTP header.

* * * * *

UNITED STATES PATENT AND TRADEMARK OFFICE
CERTIFICATE OF CORRECTION

| | | |
|---|---|---|
| PATENT NO. | : 7,827,263 B1 | Page 1 of 1 |
| APPLICATION NO. | : 11/468584 | |
| DATED | : November 2, 2010 | |
| INVENTOR(S) | : Mark E. Howarth et al. | |

It is certified that error appears in the above-identified patent and that said Letters Patent is hereby corrected as shown below:

In column 3, line 11 please delete "determined, if" and replace it with --determined. If--.

Signed and Sealed this
Twenty-ninth Day of March, 2011

David J. Kappos
*Director of the United States Patent and Trademark Office*